March 14, 1933.   P. A. JACOBSON   1,901,452
SAUSAGE LINKING MACHINE
Filed June 13, 1930   3 Sheets-Sheet 1
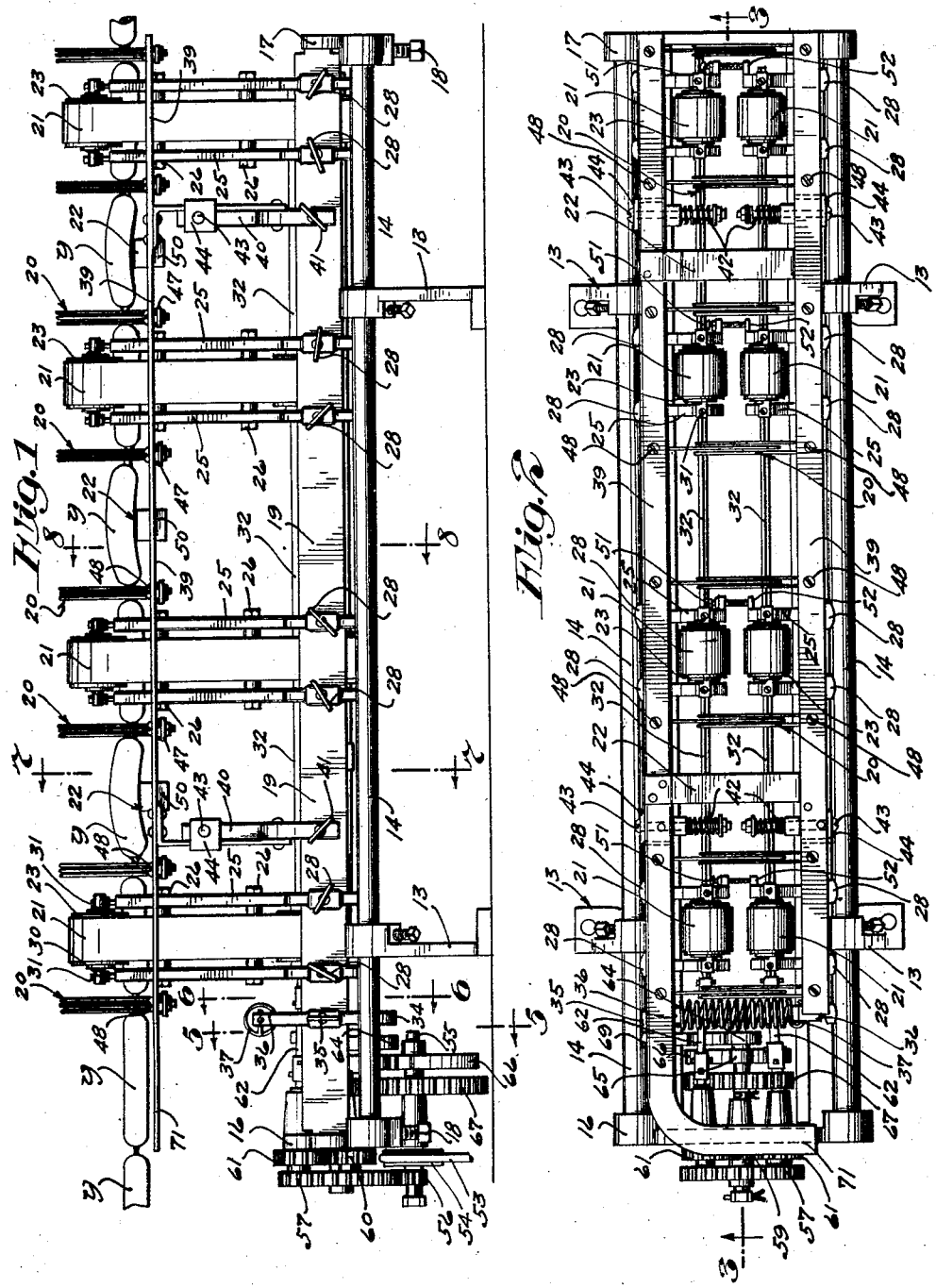
Inventor
Parker A. Jacobson
By his Attorneys March 14, 1933.  P. A. JACOBSON  1,901,452
SAUSAGE LINKING MACHINE
Filed June 13, 1930  3 Sheets-Sheet 2
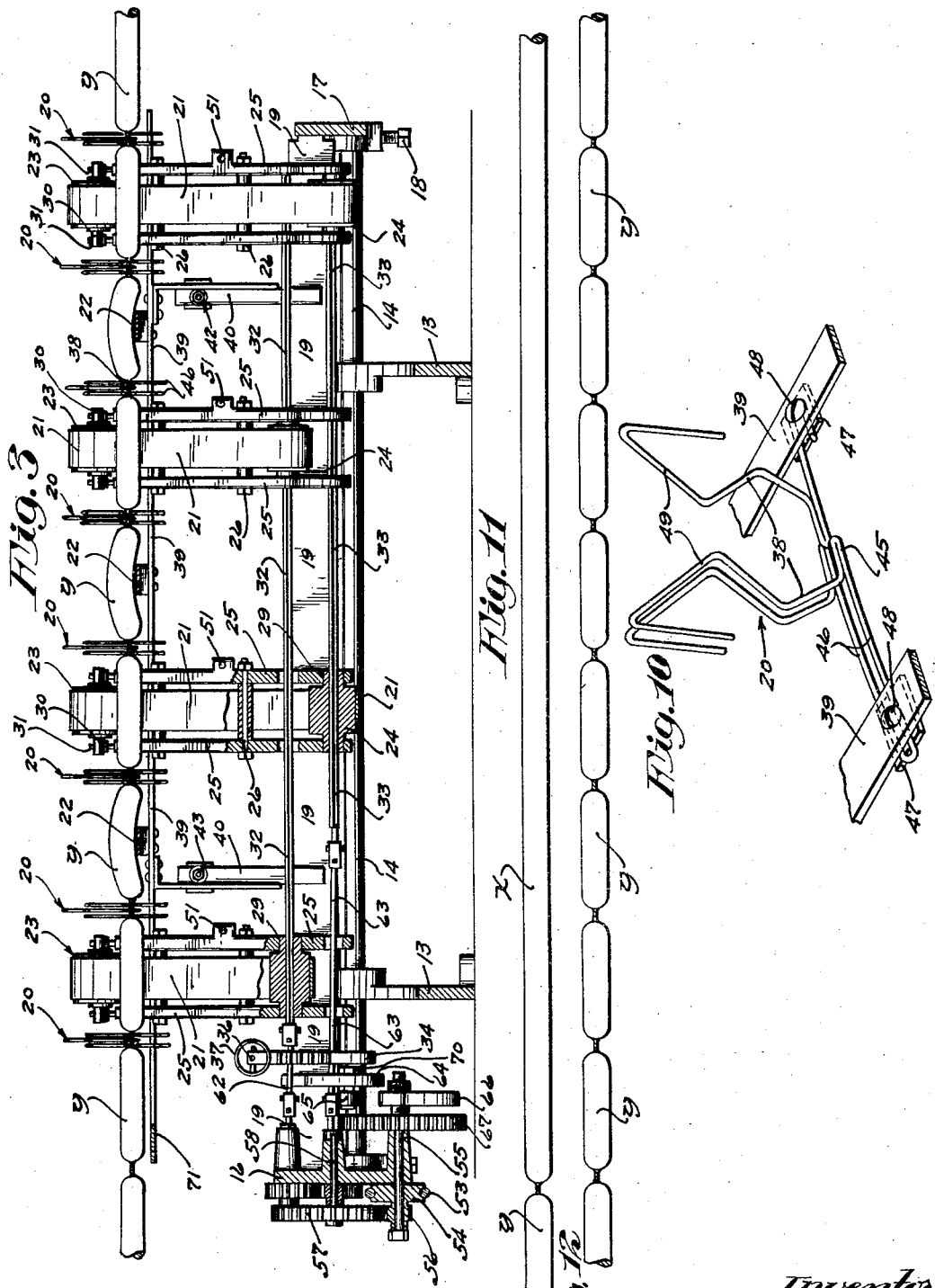

March 14, 1933.  P. A. JACOBSON  1,901,452
SAUSAGE LINKING MACHINE
Filed June 13, 1930  3 Sheets-Sheet 3
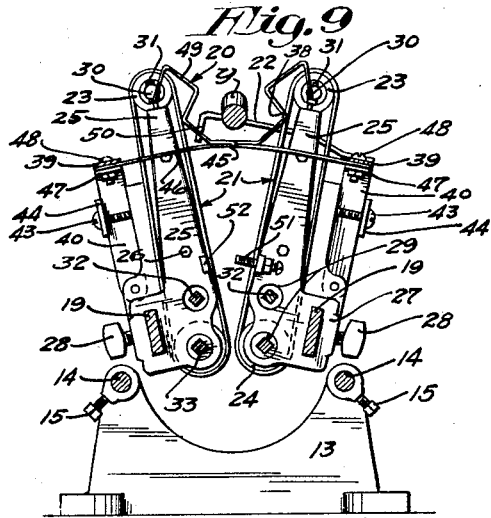
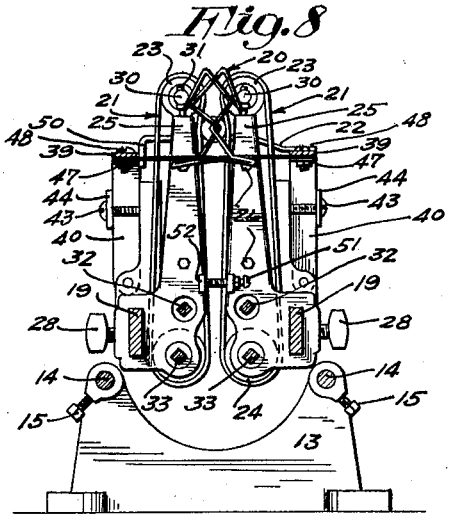
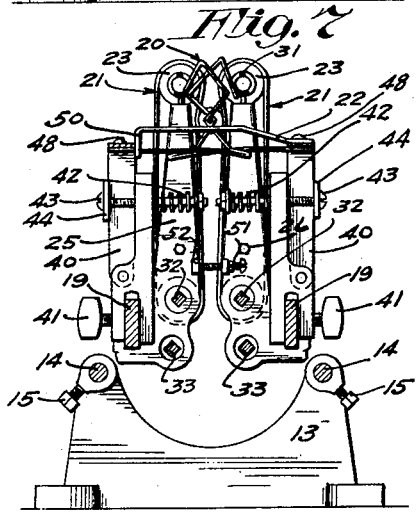
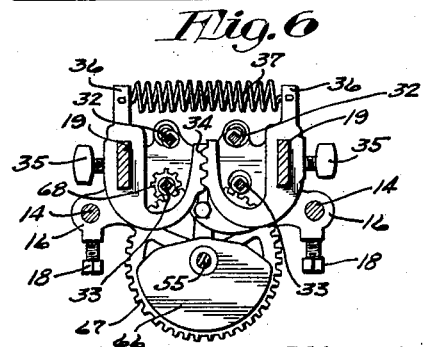
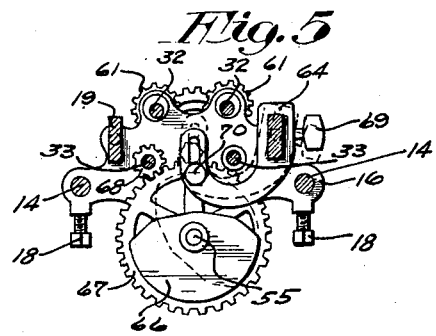
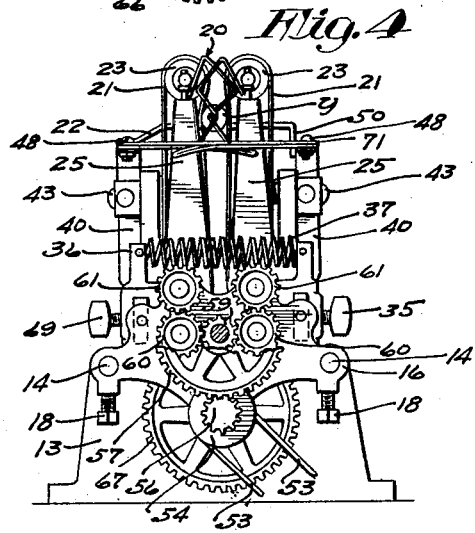
Inventor
Parker A. Jacobson
By his Attorneys
Merchant and Kilson Patented Mar. 14, 1933

1,901,452

UNITED STATES PATENT OFFICE

PARKER A. JACOBSON, OF WINONA, MINNESOTA

SAUSAGE LINKING MACHINE

Application filed June 13, 1930. Serial No. 460,935.

This invention relates to a sausage linking machine and has for its object the provision of such a machine that is relatively simple, compact, of light-weight, highly efficient and positive in its action, and having an open or top feed through which a casing may be placed in the machine by a lateral movement and the formed links removed therefrom by a like movement, thus permitting fast manual feed.

The invention further includes duplicate units which may be very quickly added to the machine or removed therefrom to vary the capacity thereof and it further includes interchangeably usable combined spacers and squeezers for forming links of different lengths. The machine may be quickly knocked-down to permit cleansing and sterilizing thereof and then reassembled with little work and without the use of tools.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a front side elevation of the improved sausage linking machine;

Fig. 2 is a plan view of the same;

Fig. 3 is a view partly in elevation and partly in section taken on the line 3—3 of Fig. 2;

Fig. 4 is a left-hand elevation of the machine, some parts being broken away;

Figs. 5, 6, 7 and 8 are transverse vertical sections taken on the lines 5—5, 6—6, 7—7 and 8—8 of Fig. 1, respectively;

Fig. 9 is a view corresponding to Fig. 8, but showing the machine open;

Fig. 10 is a fragmentary perspective view of one of the combined spacers and squeezers;

Fig. 11 is an elevation of a filled sausage casing ready to be placed in the machine to be formed into links; and Fig. 12 is a view of the casing removed from the machine and formed in links.

The frame of the machine includes a pair of laterally spaced end members 13 and a pair of longitudinal side bars 14, which extend through bossed holes in said end members and are rigidly secured thereto by set-screws 15. Said end members 13 have apertured feet which may be secured to a table or other support by anchor studs, not shown.

Bearing heads 16 and 17 are mounted on the left and right-hand ends of the side bars 14, respectively, outward of the end members 13. These bearing heads 16 and 17 have bossed holes into which the ends of the side bars 14 extend and are rigidly secured thereto by set-screws 18. The frame 13—14 and the bearing heads 16 and 17 may be readily knocked-down by loosening the set-screws 15 and 18 and withdrawing the side bars 14 from the bossed holes in the end members 13 and heads 16 and 17 through which they extend.

A pair of radially spaced rock-shafts 19, in the form of flat bars set vertically edgewise parallel to the side bars 14, have on their ends trunnions journaled in seats in the heads 16 and 17.

Combined spacers and squeezers 20 are provided for displacing the filler in a sausage casing X, at longitudinally spaced points, to form links Y and alternate links Y are twisted in reverse directions by pairs of cooperating belts 21 and the intervening links are held stationary by supports 22. For brevity the combined spacers and squeezers 20 will hereinafter be referred to as spacers.

The machine illustrated includes four pairs of twisting belts 21 which simultaneously form seven links Y in the casing X. Said machine may have only a single pair of twisting belts 21, with a capacity for simultaneously forming three links and each pair of belts 21 added to the machine will increase its capacity by two links.

The twisting belts 21 are flat, relatively wide and are formed from a woven or other material having a good friction surface. Each belt 21 of each pair is mounted to run over a relatively small upper pulley 23 and a relatively large lower pulley 24 and which pulleys are carried by a pair of laterally spaced arms 25 rigidly connected by upper and lower cross-ties 26 which extend between the runs of the respective belt 21 and each thereof includes a thimble and a nut-equipped bolt. The arms 25 have on their backs at the lower ends thereof outwardly projecting extensions 27 having seats through which the respective shafts 19 project. The polygonal formation of the shafts 19 and their seats hold said arms from turning said shafts but permit lateral adjustments longitudinally thereon. Set-screws 28 in the arm extensions 27 impinge against the shafts 19 and hold the arms 25 where adjusted longitudinally thereon.

The lower pulleys 24 have trunnions journaled in either upper or lower seats 29 in the pairs of arms 25 and the upper pulleys 23 are loosely journaled on fixed short shafts 30 carried by screws 31, which act as tighteners for the belts 21. These screws 31 extend radially through holes in the ends of the shafts 30, are swivelled therein, have screw-threaded engagement with the upper end portions of the arms 25 and form longitudinal extensions thereof.

The twisting belts 21 of each pair are driven in reverse directions and adjacent belts 21 on each rock-shaft 19 are reversely driven. Said belts 21, carried by each rock-shaft 19, are alternately long and short with their upper pulleys 23 in axial alignment which leaves their lower ends of different lengths with the lower pulleys 24 for the long belts 21 in axial alignment and the lower pulleys 24 for the short belts 21 in axial alignment.

The pulleys 24 for the short belts 21 are driven by an upper shaft 32 and the pulleys 24 for the long belt 21 are driven by the lower shaft 33. These shafts 32 and 33 are square and extend through correspondingly formed seats in the lower pulleys 24 at the axes thereof. The polygonal formation of the shafts 32 and 33 and their seats in the lower pulleys 24 connect said shafts and pulleys for common rotation but permit axial sliding movement of the pulleys 24 on the shafts 32 and 33.

The upper shafts 32 extend between the runs of the long belts 21 and loosely through the upper trunnion seats 29 in the respective arms 25 and the lower shafts 33, extend below the pulleys 24 for the short belts 21 and loosely through the lower trunnion seats 29 in the respective arms 25.

A pair of intermeshing segmental gears 34 connect the rock-shafts 19 for common rotary movement and open and close the arms 25 of each pair at the same speed and in predetermined relation. The rock-shafts 19 extend through seats in the hubs of the segmental gears 34 and hold said gears from turning about the axes of the rock-shafts 19 but with freedom for longitudinal sliding movement thereon. Set-screws 35 in the hubs of the segmental gears 34 impinge against the rock-shafts 19 and hold the segmental gears 34 thereon between the bearing head 16 and adjacent pair of arms 25. Integral with the hubs of the segmental gears 34 is a pair of upstanding posts 36 connected by a coiled spring 37 under strain to rock the shafts 19 and close the belts 21 onto the sausage casing X, as will presently appear.

The spacers 20 are arranged in pairs with one of the pairs of belts 21 therebetween and spaced equi-distant therefrom. Each spacer 20 includes a pair of cooperating jaws 38 carried on a pair of longitudinal bars 39 which extend parallel to the rock-shafts 19 and thereabove. The bars 39 are rigidly secured to the outer ends of the outer sections of two-part upstanding arms 40. The inner ends of the inner sections of the arms 40 are bifurcated, straddle the rock-shafts 19 and are adjustably but rigidly secured thereto by set-screws 41. Said upper sections of the arms 40 are pivoted to the inner sections of said arms, at one side thereof, intermediate of their ends, for swinging movement transversely of the rock-shafts 19. The upper sections of the arms 40 are yieldingly drawn inward in respect to the lower sections thereof by coiled springs 42 carried by nut-equipped bolts 43 which they encircle. These bolts 43 extend through aligned holes in lugs 44 on the upper sections of the arms 40 and in the outer end portions of the lower sections of said arms and the springs 42 are compressed between said lower sections and nuts on the bolts 43; see Fig. 7.

One jaw 38 of each pair comprises a single member and the other a pair of laterally spaced members between which said single member is arranged to move, see Fig. 10. The opposing or operative faces of the jaws 38 are V-shaped and when closed form a continuous surface that engages the casing X throughout its entire circumference. At the bottom of the jaws 38 the spacers 20 have formed therewith overlapping fingers 45 for supporting the casing X in said spacers. Outwardly projecting shanks 46 formed with the spacers 20 are rigidly secured to the bars 39 by clamps comprising plates 47 and nut-equipped bolts 48, and which clamps support the spacers 20 of each pair in cooperative relation with freedom for adjustment toward or from each other to vary the opening between the jaws 38 when closed. Above the jaws 38 the spacers 20 have upwardly and outwardly diverging extensions 49 the upper ends of which extend downward to form smooth upper ends on said spacers to prevent the casing X from being broken when placed therein.

The extensions 49 when the jaws 38 are open form a hopper-like opening for directing the casing X laterally downward between the jaws 38. The fingers 45 support the casing X while the jaws 38 are being clamped thereon and after said jaws have been opened at the completion of the forming of said casing into links Y. As the jaws 38 close on the casing X the same is gradually squeezed by the converging surfaces of said jaws and the filling in said casing crowded in opposite directions and the casing gathered into a close mass so that the same may be readily twisted. Each member of each spacer 20 is formed from a single smooth round wire that has no rough or sharp surfaces tending to break the casing X.

The supports 22 are in the form of flat fingers which extend transversely between the bars 39, are rigidly secured at their front ends to the front bar 39 and their other or rear ends are bent laterally downward to form stops 50 arranged to engage the rear bar 39 at its front longitudinal edge and limit the closing movement of the jaws 38. It is important to note by reference to Figs. 1 and 7 that the elevation of the supporting fingers 22 is such that the end portions of the links Y resting thereon are held drawn downward by the spacers 20 so that said links are bent over the supports 22 under sufficient tension to hold said links from turning on said supports while the adjacent links are being twisted in opposite directions by the respective pairs of belts 21.

The sectional arms 40 and their spring connections 42 permit independent adjustment of the arms 25 of each pair in respect to the jaws 38 to vary the distance between the opposing faces of the belts 21 of each pair without affecting the adjustment of the jaws 38 in respect to each other. The approaching or closing movement of the belts 21 of each pair is limited by an adjustable stop in the form of a set-screw 51, on the front left-hand arm 25 of each twisting belt 21, and a cooperating striking lug 52 on the opposite rear arm of said pair, see Figs. 7, 8 and 9.

The shafts 32 and 33 are constantly driven, during the operation of the machine, and hence, the belts 21 by their lower pulleys 24 on said shafts, from an electric motor, not shown, by a round belt 53 which runs over a grooved pulley 54 loose on the outer end portion of a short shaft 55 journaled in the bearing head 16. On the outer face of the pulley 54 is a spur pinion 56 which meshes with a spur gear 57 journaled on the outer end of a short shaft 58 journaled in the bearing head 16. Secured to the shaft 58 at the inner face of the gear 57 is a spur pinion 59 with which two diametrically opposite gears 60 mesh and that are secured one to each of the two shafts 33. A pair of gears 61 secured one to each of the shafts 32 mesh one with each of the gears 60 to drive said shafts from the shafts 33, see Fig. 4.

The shafts 32 and 33 have flexible sections 62 and 63, respectively, between the bearing head 16 and the adjacent pulleys 24 driven thereby. The purpose of these flexible sections 62 and 63 is to permit the required oscillatory movement of the arms 25 to open and close the belts 21. It will be noted, by reference to Fig. 5, that the sections of the shafts 32 and 33 journaled in the bearing head 16 are round while the other sections thereof are square, as previously stated.

The rear rock-shaft 19 is operated from the front driven shaft 33, and hence, the front rock-shaft 19 by the segmental gears 34 which connect said two shafts, to positively open the spacers 20 and belts 21 of the several pairs and control their closing movements under the action of the spring 37, by the following connections, to wit: A crank-arm 64 on the rear rock-shaft 19 has a cam roller 65 yieldingly held by the spring 37 on the periphery of a cam 66 on the shaft 55 having a spur gear 67 which meshes with a spur pinion 68 on said shaft 33. The crank-arm 64 is mounted on the respective rock-shaft 19 for longitudinal sliding movement thereon and is held where positioned by a set-screw 69, see Fig. 5.

The cam roller 65 is journaled on a stud 70 adjustably mounted in a slot in the crank-arm 64 to vary the extent of the opening movement of the spacers 20 and belts 21. In case the operator gets his hand or any other obstruction between the spacers 20 or twisting belts 21 further closing movement thereof under the action of the spring 37 will be stopped and the cam roller 65 will simply be held out of contact with the cam 66 and thus prevent bodily injury to the operator or damage or strain the machine.

The left-hand end of the rear bar 39 is bent laterally forward and its left-hand edge affords a gauge 71 at which the right-hand end of the casing X is held when placing the same in the machine so that the link Y formed between said gauge and adjacent spacers 20 will be of the same length as the other links Y.

Briefly stated, the action of the machine is as follows:

The belts 21 are constantly driven and the spacers 20 and the belts 21 of the several pairs are intermittently opened and closed under the action of the spring 37 and cam 66 and which cam and the segmental gears 34 positively operate the rock-shafts 19 to open said spacers and belts against the action of the spring 37 and control their closing movements under the action of said spring. The filled casing X to be formed into links Y is placed at the right-hand end of the machine and the operator picks up one end portion thereof, holds the same at two longitudinally spaced points and when the spacers 20 and the belts 21 are opened, places said casing therebetween on the supports 22 and the supporting fingers 45 with the left-hand end of said casing at the gauge 71. The two points at which the casing X is thus held are just outside of the two outermost spacers 20 and said casing is held at their two points from turning during the action thereon by the belts 21 to form the same into links Y.

During the closing of the spacers 20 their jaws 38 first engage the casing X at longitudinally spaced points, which determines the length of the links Y, and squeezes the filling in said casing X in opposite directions, places tension thereon and gathers the casing X at these points into small compact form. The closing movement of the spacers 20 on the casing X is limited by the engagement of the stops 50 with the rear bar 39, see Fig. 7. The closing action of the spacers 20 bends the casing X resting on the supports 22 thereover and under tension which securely holds said casing at these points from turning during twisting of the casing X by the belts 21 to form the links Y therein.

Substantially at the completion of the closing of the spacers 20 on the casing X the opposing belts 21 of the several pairs are brought into engagement with said casing at diametrically opposite points with sufficient pressure to cause their oppositely moving faces to twist the sections of the casing X between the pairs of spacers 20. As previously stated, the links Y on opposite sides of the links on the supports 22 are turned in opposite directions to prevent unwinding when the links Y are removed from the machine.

The closing movements of the belts 21 on the casing X is limited by the screws 51 and these screws may be adjusted for casings of different diameters and to vary the pressure placed thereon to produce turning movement thereof. The opening of the belts 21 and the spacers 20 of the several pairs by the cam 66 completes the twisting of the casing X and the formed links are then removed from the machine. The operator then picks up the casing to the right of the formed links, places the same in the machine with the right-hand end of the last formed link at the gauge 71 and the action of the machine just described is repeated to form the sections of said casing into links.

If it is desirable to change the length of the links Y from that formed by the spacers 20 with which the machine is equipped, it is only necessary to release the screws 41 and remove the spacing mechanism from the rock-shafts 19 and substitute other spacing mechanism therefor in which the distance between its spacers is such as to form the links Y of the desired length. When mounting other spacing mechanism on the machine the set-screws 28 are released and the arms 25 longitudinally adjusted on the rock-shafts 19 to position the belts 21 midway between adjacent pairs of spacers 20. The formation of the spacing mechanism is such that the casing X may be placed therein or removed therefrom by a lateral movement which may be done by easy and quick operations that increase the capacity of the machine over one in which a casing is fed endwise thereto. This open or top feed of the spacing and twisting mechanisms materially reduces the chances of breaking or damaging a casing.

To cleanse and sterilize the machine, it may be very easily and quickly knocked-down by loosening the right-hand set-screws 18 to release the bearing head 17 from the side bars 14 and the rock-shafts 19 and permit said rock-shafts to be detached from the bearing head 16 by axial movements to the right. By loosening the set-screws 41 the spacing mechanism may be detached from the rock-shafts 19 and thereafter by releasing the set-screws 28, 35 and 69 the rock-shafts 19 may be withdrawn from the arms 25, segmental gears 34 and crank-arm 64.

The open or top feed to the spacers 20 and belts 21 permits the operator to use up the entire length of a casing as the same may be held so that only one or more of the pairs of belts 21 act thereon.

The construction and arrangement of the combined spacers and squeezers, wherein one thereof of each pair moves within the other, is highly important in that the members of said pairs hold each other for straight line movement to prevent shearing of the casing therebetween.

Each unit of the machine is a rigid self-contained structure that takes all the strains from the shafts that drive the twisting belts and holds said belts to their work and under the desired tension.

What I claim is:

1. In a sausage linking machine, a pair of rock-shafts, two pairs of arms mounted on the rock-shafts and spaced longitudinally thereof, cooperating spacers and squeezers carried by the arms, a pair of cooperating twisting belts mounted on the rock-shafts between said two pairs of arms, means for driving the belts, means for operating the rock-shafts to open and close the spacers and squeezers and belts, said arms having hinge joints that permit secondary opening and closing movements of the spacers and squeezers in respect to the rock-shafts and belts, and which structure further includes yielding means under strain to close the spacers and squeezers.

2. In a sausage linking machine, a pair of rock-shafts, a pair of arms mounted on each rock-shaft, a tie-bar connecting the arms on each rock-shaft, two units spaced longitudinally of the rock-shaft and each comprising two pairs of spacers and squeezers mounted on said bars and a pair of cooperating twisting belts mounted therebetween on the rock-shafts, means for driving the belts, means for operating the rock-shafts to open and close the spacers and squeezers and belts, and a sausage casing support between said two units and carried by one of the tie-bars.

3. The structure defined in claim 2 in which said arms have hinge joints that permit secondary opening and closing movements of the spacers and squeezers in respect to the rock-shafts and belts, said structure further includes yielding means under strain to close the spacers and squeezers.

4. In a sausage linking machine, a frame having a pair of bearing heads, a pair of rock-shafts journaled in the bearing heads, one of the bearing heads being displaceable to permit the removal of the rock-shafts from the bearing heads, cooperating spacers and squeezers removably mounted on the rock-shafts, cooperating pairs of twisting belts removably mounted on the rock-shafts with freedom for independent adjustment longitudinally thereon, means for driving the belts including shafts having removable pulleys, and means for operating the rock-shafts to open and close the spacers and squeezers and belts and separable from the rock-shafts.

5. In a sausage linking machine, two pairs of spacers and squeezers and a pair of cooperating twisting belts between the two pairs of spacers and squeezers, said pairs of spacers and squeezers and the pair of belts being mounted for independent opening and closing movements, means for operating the belts, means for opening and closing the belts, means for closing the spacers and squeezers, and means controlled by the means for opening the belts for opening the spacers and squeezers.

6. The structure defined in claim 5 in which the means for closing the spacers and squeezers will yieldingly retard the closing movement of the spacers and squeezers in respect to the belts and also permit the spacers and squeezers to open in respect to the belts.

7. The structure defined in claim 5 which further includes an adjustable stop for limiting the closing movement of the belts for casings of different diameters, and in which the closing movements of the spacers and squeezers are controlled by the final closing movement of the belts.

8. In a sausage linking machine, four pairs of spacers and squeezers, a pair of twisting belts between the first and second pairs and a second pair of spacers and squeezers between the third and fourth pairs of spacers and squeezers, means for operating the belts of the two pairs in reverse directions, means for opening and closing the belts, means for opening and closing the spacers and squeezers, and a link support between the second and third pairs of spacers and squeezers and located above the axis of the adjacent spacers and squeezers over which a link is held buckled by said second and third pairs of spacers and squeezers to prevent the same from turning while the links between the two pairs of belts are being turned in reverse directions thereby.

9. In a sausage linking machine, four pairs of spacers and squeezers, a pair of twisting belts between the first and second pairs and a second pair of spacers and squeezers between the third and fourth pairs of spacers and squeezers, means for operating the belts of the two pairs in reverse directions, means for opening and closing the belts, means for opening and closing the spacers and squeezers, a combined stop and link support between the second and third pairs of spacers and squeezers and operative to limit the closing movement of the spacers and squeezers and hold the respective link from turning.

10. In a sausage linking machine, a pair of bars mounted for movement toward and from each other, four pairs of spacers and squeezers mounted on the bars, a pair of rock-shafts, a pair of belt carriers on the rock-shafts between the first and second pair of spacers and squeezers and between the third and fourth pair of spacers and squeezers, a pair of cooperating twisting belts mounted on each pair of belt carriers, yielding means operative on the rock-shafts to hold the belts closed, and means for operating the rock-shafts to open the belts and the spacers and squeezers.

11. The structure defined in claim 10 in which the mounting of the bars include pivoted arms which support the bars for swinging movement toward and from each other, said structure further including yielding means under strain to draw the bars toward each other.

12. The structure defined in claim 10 in which the belt carriers are adjustable on the rock-shafts for links of different lengths.

13. In a sausage linking machine, a frame having a pair of bearing heads, a pair of rock-shafts journaled in the bearing heads, one of said bearing heads being displaceable to permit the removal of the rock-shafts from the bearing heads, cooperating spacers and squeezers removably mounted on the frame, cooperating pairs of twisting belts removably mounted on the rock-shafts, means for driving the belts including shafts having removable pulleys, and means for operating the rock-shafts to open the belts and spacers and squeezers.

14. The structure defined in claim 13 in which the twisting belts are adjustable on the rock-shafts for links of different lengths.

15. In a sausage linking machine, a pair of removable bars mounted for movement toward and from each other, four pairs of spacers and squeezers spaced longitudinally on the bars, two pairs of belt carriers, the belt carriers of each pair being mounted for movement toward and from each other, a pair of twisting belts mounted on each pair of belt carriers, one pair of belt carriers being mounted between the first and second pair of spacers and squeezers, the other pair of said belt carriers being mounted between the third and fourth pair of spacers and squeezers, means for driving the twisting belts in reverse directions, and means for holding a link between the second and third pair of spacers and squeezers while links between the first and second pair of spacers and squeezers and between the third and fourth pair of spacers and squeezers are being turned in reverse directions by the two pairs of belts, one pair of said belt carriers being adjustable toward or from the other pair of belt carriers to compensate for the spacers and squeezers when positioned to form links of different lengths.

16. In a sausage linking machine, four pairs of spacers and squeezers spaced one in advance of the other, two pairs of belt carriers, the belt carriers of each pair being mounted for movement toward and from each other, a pair of twisting belts mounted on each pair of belt carriers, one pair of belt carriers being mounted between the first and second pair of spacers and squeezers and the other pair of said carriers being mounted between the third and fourth pair of spacers and squeezers, means for driving the twisting belts in reverse directions, and means for holding a link between the second and third pair of spacers and squeezers while links between the first and second pair of spacers and squeezers and between the third and fourth pair of spacers and squeezers are being turned in reverse directions by the two pairs of belts, one pair of said belt carriers being adjustable toward or from the other pair of belt carriers to compensate for the spacers and squeezers when positioned to form links of different lengths.

17. In a sausage linking machine, a pair of rock-shafts, a plurality of arms on each rock-shaft, an upper pulley and a lower pulley on each arm, a belt arranged to run over the upper and lower pulleys of each arm, the lower pulleys being staggered in respect to the plane of the belt and in two series, the pulleys of each series being axially aligned, a driving shaft for each series of lower pulleys, the two driving shafts being driven in reverse directions, the belts on the two rock-shafts being arranged in cooperating pairs, and means for operating the rock-shafts to reciprocate the arms and open and close the belts of said pairs.

18. In a sausage linking machine two pairs of spacers and squeezers and a pair of cooperating twisting belts therebetween, means for operating the belts, yielding means for closing the belts and the spacers and squeezers, positive means for opening the belts and the spacers and the squeezers, said spacers and squeezers being mounted for slight independent opening movement with respect to the belts, and spring means holding the spacers and squeezers in normal position with respect to the belts.

In testimony whereof I affix my signature.
PARKER A. JACOBSON.